United States Patent
Derkacz et al.

(10) Patent No.: US 9,863,239 B2
(45) Date of Patent: Jan. 9, 2018

(54) SELECTING TRANSMISSION FREQUENCY BASED ON FORMATION PROPERTIES

(71) Applicant: EVOLUTION ENGINEERING INC., Calgary (CA)

(72) Inventors: Patrick R. Derkacz, Calgary (CA); Aaron William Logan, Calgary (CA); Justin C. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 15/320,294

(22) PCT Filed: May 8, 2015

(86) PCT No.: PCT/CA2015/050418
§ 371 (c)(1),
(2) Date: Dec. 19, 2016

(87) PCT Pub. No.: WO2015/192225
PCT Pub. Date: Dec. 23, 2015

(65) Prior Publication Data
US 2017/0268330 A1    Sep. 21, 2017

Related U.S. Application Data

(60) Provisional application No. 62/014,450, filed on Jun. 19, 2014.

(51) Int. Cl.
*E21B 47/12* (2012.01)
*E21B 49/00* (2006.01)
(Continued)

(52) U.S. Cl.
CPC .......... *E21B 47/122* (2013.01); *E21B 17/003* (2013.01); *E21B 49/00* (2013.01);
(Continued)

(58) Field of Classification Search
CPC ...................................................... G01V 3/20
(Continued)

(56) References Cited

U.S. PATENT DOCUMENTS

| 4,578,675 A | 3/1986 | MacLeod |
| 5,160,925 A | 11/1992 | Dailey et al. |

(Continued)

FOREIGN PATENT DOCUMENTS

| CA | 2593943 A1 | 6/2008 |
| CN | 203321511 U | 12/2013 |

(Continued)

*Primary Examiner* — Albert Wong
(74) *Attorney, Agent, or Firm* — Oyen Wiggs Green & Mutala LLP (57) ABSTRACT

A method and apparatus for downhole data transmission. The method comprising monitoring electrical impedance properties of a downhole formation by applying an electrical signal between a first portion and a second portion of a drill string that are electrically insulated from each other by an insulating portion, selecting a frequency for transmitting data by electromagnetic telemetry based at least in part on the monitored electrical impedance and transmitting the data by encoding the data in a waveform having the selected frequency and applying the waveform between the first portion and the second portion of the drill string.

27 Claims, 3 Drawing Sheets

(51) Int. Cl.
*E21B 17/00* (2006.01)
*G01V 3/20* (2006.01)
*G08C 19/12* (2006.01)
*E21B 47/00* (2012.01)

(52) U.S. Cl.
CPC ............... *G01V 3/20* (2013.01); *G08C 19/12* (2013.01); *E21B 47/00* (2013.01)

(58) Field of Classification Search
USPC .......................................... 340/854.6; 175/50
See application file for complete search history.

(56) References Cited

U.S. PATENT DOCUMENTS

| | | |
|---|---|---|
| 5,467,083 A | 11/1995 | McDonald et al. |
| 5,883,516 A | 3/1999 | Van Steenwyk et al. |
| 6,396,276 B1 * | 5/2002 | Van Steenwyk ...... E21B 47/122 175/50 |
| 7,080,699 B2 | 7/2006 | Lovell et al. |
| 7,436,184 B2 | 10/2008 | Moore |
| 7,782,060 B2 | 8/2010 | Clark et al. |
| 2006/0215491 A1 * | 9/2006 | Hall ........................ E21B 47/18 367/83 |
| 2007/0052551 A1 | 3/2007 | Lovell et al. |
| 2009/0066334 A1 | 3/2009 | Peter |
| 2013/0043874 A1 | 2/2013 | Clark et al. |
| 2013/0257436 A1 | 10/2013 | Bittar et al. |
| 2013/0328692 A1 | 12/2013 | Johannessen |
| 2014/0132271 A1 | 5/2014 | Liu et al. |
| 2014/0191879 A1 * | 7/2014 | Bittar .................. E21B 43/2406 340/854.1 |
| 2014/0218037 A1 | 8/2014 | Slater et al. |

FOREIGN PATENT DOCUMENTS

| | | |
|---|---|---|
| EP | 1035299 A2 | 9/2000 |
| EP | 0916101 B1 | 4/2008 |
| GB | 2419419 B | 3/2007 |
| WO | 2010065205 A1 | 6/2010 |
| WO | 2014071520 A1 | 5/2014 |
| WO | 2014075190 A1 | 5/2014 |

* cited by examiner

SELECTING TRANSMISSION FREQUENCY BASED ON FORMATION PROPERTIES

TECHNICAL FIELD

This application relates to measuring the properties of a formation in which a wellbore is being drilled. Embodiments are applicable to measuring formation resistivity.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electromechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit. Some downhole probes are highly specialized and expensive.

Downhole conditions can be harsh. A probe may experience high temperatures; vibrations (including axial, lateral, and torsional vibrations); shocks; immersion in drilling fluids; high pressures (20,000 p.s.i. or more in some cases); turbulence and pulsations in the flow of drilling fluid past the probe; fluid initiated harmonics; and torsional acceleration events from slip which can lead to side-to-side and/or torsional movement of the probe. These conditions can shorten the lifespan of downhole probes and can increase the probability that a downhole probe will fail in use. Replacing a downhole probe that fails while drilling can involve very great expense.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

SUMMARY

The invention has a number of aspects. Some aspects provide methods for downhole data transmission. Other aspects provide drilling apparatus for downhole data transmission.

In some embodiments, the method comprises monitoring electrical impedance properties of a downhole formation by applying an electrical signal between a first portion and a second portion of a drill string that are electrically insulated from each other by an insulating portion. Based at least in part on the monitored electrical impedance a frequency may be selected for transmitting data by electromagnetic telemetry. The data may be transmitted by encoding the data in a waveform having the selected frequency and applying the waveform between the first portion and the second portion of the drill string.

In some embodiments, the electrical impedance properties of the formation comprise capacitive reactance of the formation.

In some embodiments, determining a capacitance of the formation in the vicinity of the insulating portion based on measurements of the capacitive reactance of the formation at two or more frequencies.

In some embodiments, the insulating portion is between a mud motor and a drill bit.

Another aspect of the invention provides a drilling apparatus. In some embodiments, the drilling apparatus comprises a module associated with an electrically-insulating gap portion electrically-separating electrically-conductive portions of the drill string above and below the gap portion. The module may comprise a power source operative to apply a voltage across the gap portion at any of a plurality of frequencies, a current meter operative to monitor an electrical current being delivered from the power source to one or both of the electrically conductive portions, and a controller connected to control the power source.

In some embodiments, the controller may be configured to monitor electrical impedance properties of a downhole formation by applying an electrical signal across the gap portion of the drill string. A frequency for transmitting data by electromagnetic telemetry may be selected based at least in part on the monitored electrical impedance. The data may be transmitted by encoding the data in a waveform having the selected frequency and controlling the power source to apply the waveform across the gap portion.

In some embodiments, the module is mounted between a mud motor and a drill bit.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
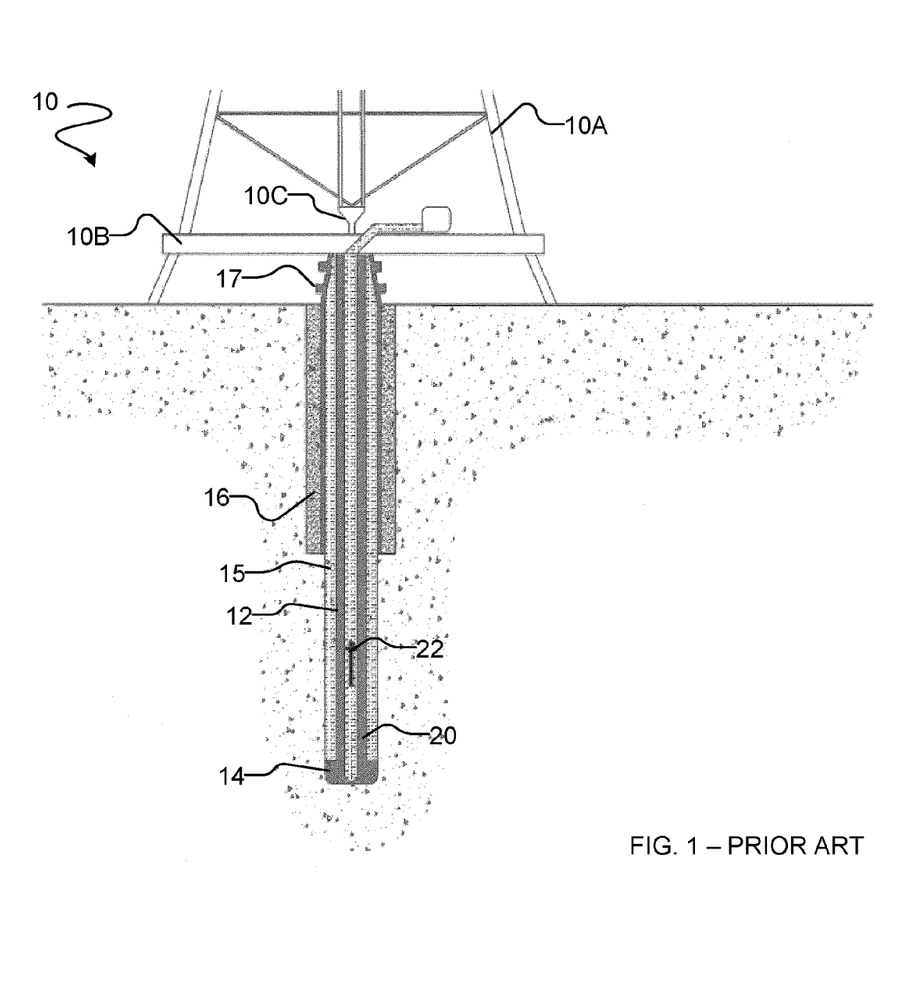
FIG. 1 is a schematic view of an example prior art drilling operation.

FIG. 1 shows schematically an example prior art drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

Some embodiments provide an EM telemetry system that includes an electrically-insulating gap. An EM telemetry transmitter is connected across the gap. The same gap is used to acquire information regarding the properties of surrounding formations (e.g. by monitoring current flow when a potential difference is applied across the gap).

Figure 2:
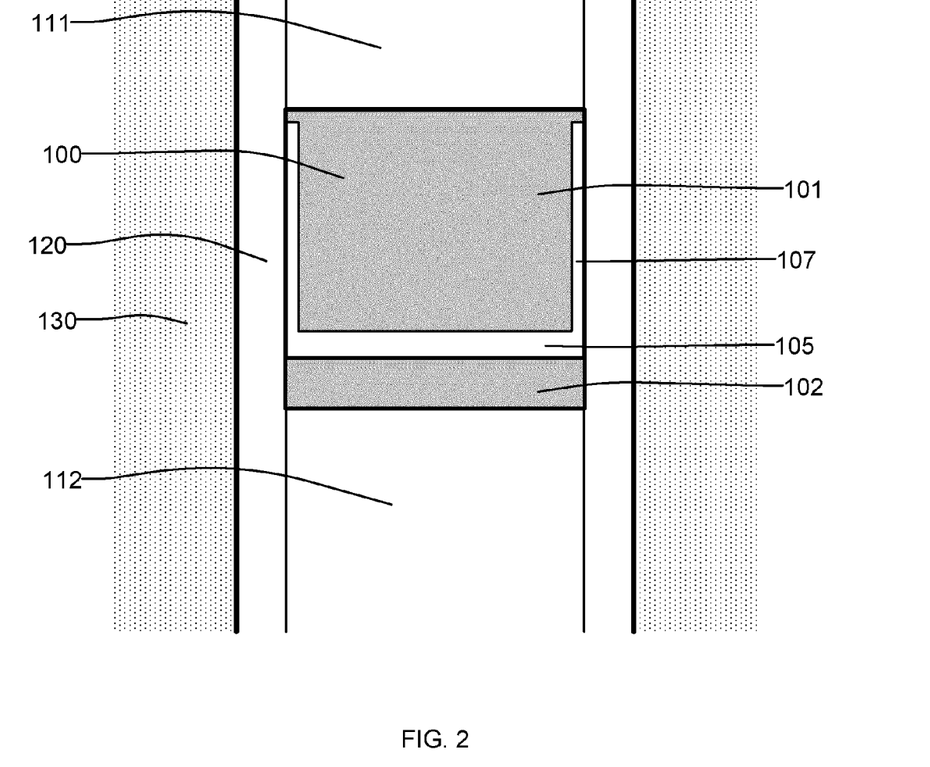
FIG. 2 is a cross-sectional view of a formation-measuring module according to an example embodiment of the invention.

FIG. 2 is a cross-sectional view of a formation-measuring module 100 according to an example embodiment of the invention. Module 100 is connected between drill string sections 111 and 112. Module 100 comprises a first portion 101 and a second portion 102. First portion 101 and second portion 102 are electrically insulated from one another by insulating portion 105. An insulating sleeve 107 extends along a portion of the exterior surface of module 100. Sleeve 107 may, for example, be made of ceramic, a suitable plastic, or the like. Insulating sleeve 107 overlaps or otherwise contacts insulating portion 105 and thereby extends the length of the gap on the outside surface of module 100. The sleeve may have a significant length (e.g. 10, 20, 50, 100, 200, or 500 centimeters) between first portion 101 and second portion 102. In some non-limiting example embodiments, first portion 101 and second portion 102 are electrically-insulated from one another by an insulating collar as described in PCT Publication No. WO2014/075190 entitled "Electromagnetic Telemetry Gap Sub Assembly with Insulating Collar".

Module 100 contains a voltage source for generating a potential difference between first portion 101 and second portion 102. The potential difference causes a current to flow between first portion 101 and second portion 102 through drilling fluid 120 and formation 130. The current may be measured to determine properties (e.g. resistivity) of formation 130. In some embodiments the voltage source is configured to provide a constant voltage. In other example embodiments the voltage source is configured to vary the applied potential difference to maintain a constant current. In still other embodiments the voltage source may output a voltage that varies as a function of the current.

The voltage source does not necessarily output direct current. In some embodiments the voltage source provides an output that is pulsating or alternating. For example, the voltage source may provide a voltage or current that varies with a desired frequency. In some example embodiments the frequency is in the range of 1 Hz to 10 kHz. For example, the frequency could be any of 2, 100, 1000, or 5000 Hz. The voltage and/or current vary sinusoidally in some embodiments. In some embodiments the frequency is variable. In such embodiments, measurements may be made at two or more different frequencies.

Module 100 may comprise a sensor for measuring properties of the current flowing between first portion 101 and second portion 102. For example, the sensor may measure amperage, voltage, and/or power. The amperage, voltage, and/or power of the current flowing between first portion 101 and second portion 102 may be analyzed to determine properties (e.g. resistivity) of formation 130. The voltage source and/or sensor may be contained within an electronics package mounted within module 100. In some embodiments the phase shift between the applied voltage between first and second portions (101, 102) and the resulting current is measured at one or more frequencies.

The effects of the resistance of the insulating portion 105 and the resistance of the drilling fluid may be taken into account when measuring or calculating properties of formation 130. The resistance of the insulating portion 105 may be measured at the surface. The resistance of the drilling fluid may be measured at the surface and assumed to be constant, or the resistance of the drilling fluid may be continuously measured at the surface as it is circulated.

The readings of the sensor may be used to determine the capacitive reactance of the formation. The formula $$X_C = \frac{1}{2\pi f C}$$

may be used, where $X_C$ is the capacitive reactance of the formation, f is the frequency of the voltage source, and C is the capacitance of the formation. The voltage source may provide voltage at two or more different frequencies in order to obtain data regarding the capacitive reactance of the formation across a range of frequencies. The capacitance of the formation may be calculated by measuring the capacitive reactance of the formation using at least two different frequencies. For relatively high frequencies, the effect of the drilling fluid on the measurements of the sensor may be relatively low.

Providing a large gap between first portion 101 and second portion 102 may cause a significant portion of the current to flow through formation 130 rather than through drilling fluid 120. The large gap may also cause the current to penetrate deeper into formation 130. The increased current through formation 130 and/or the deeper penetration of the current into formation 130 may result in more accurate measurements of the properties (e.g. resistivity) of formation 130.

Module 100 may use any means of telemetry to transmit information (e.g. resistivity measurements of formation 130) to the surface. Alternatively, or in addition, module 100 may store information (e.g. resistivity measurements of formation 130) in a downhole data store. A downhole processor may use measurements from the sensor to calculate properties of formation 130. Data representing these properties may be transmitted by any means of telemetry to the surface.

Properties of formation 130 (e.g. capacitive reactance) may be used to determine a frequency and power at which EM telemetry signals may be transmitted with high efficiency and high signal-to-noise ratio. This may help conserve the life of a downhole battery by avoiding transmitting EM telemetry signals at unnecessarily high power. In some embodiments, the power of EM telemetry signals is adjusted based on a desired duration of battery life.

In an example embodiment the measured formation properties are used to select a frequency for EM telemetry transmission at which formation 130 offers a high impedance such that, for a given power, a relatively high voltage can be used for EM telemetry. Higher-voltage EM telemetry signals tend to be more readily received at the surface than lower-voltage EM telemetry signals.

In any of the embodiments discussed herein, the impedance at a given frequency may be taken to be the capacitive reactance. In the alternative the impedance may be taken to be a combination of the capacitive reactance at the frequency with the DC resistivity of the formation. For example, the impedance may be taken to be the square root of the sum of the capacitive reactance and the DC resistivity.

In some embodiments, properties of formations between module 100 and the surface are taken into account in selecting frequency and power for EM telemetry transmissions. In an example embodiment, module 100 (or a plurality of modules 100) is used to measure formation impedance at multiple points along a wellbore. The minimum impedance along the wellbore may be determined as a function of frequency. Since electromagnetic telemetry signals may be significantly attenuated in passing through formations that present low impedances at the frequency of the EM telemetry signals one can select a frequency for electromagnetic telemetry transmissions for which the minimum impedance is relatively high (in other words, one can try to avoid frequencies corresponding to the lowest minimum impedances). Low impedances may, for example, occur in formations that have a high content of salts.

As will be apparent from the above, different factors may suggest the use of different frequencies and power levels for EM telemetry transmissions. For example, at the location of module 100 formation 130 may present a high impedance at a certain frequency (suggesting that the certain frequency would be a good choice) whereas another formation crossed by the wellbore above module 100 may present a very low impedance at the same frequency (suggesting that the frequency would be a poor choice). Another factor in selecting a frequency is that, everything else being equal, higher frequencies will provide higher data rates (more bandwidth and lower latency). However, higher frequencies tend, in general, to be more strongly attenuated than lower frequencies even under ideal conditions.

In some embodiments, particularly where modules 100 are relatively closely spaced, a frequency for use in transmitting telemetry signals may be chosen based on a measurement of impedance taken by the module 100. In some embodiments a module 100 is provided at the end of every drill-string section (e.g. every 30 feet, 60 feet or 90 feet—about every 10, 20 or 30 meters). Measurements of formation impedance may be performed continuously or periodically at the frequency being used for telemetry transmission. The frequency may be adjusted in response to the measurements. With modules 100 spaced closely a measurement of formation impedance at the location of a module is indicative of the formation impedance over the path taken by telemetry signals to the next module 100. Such embodiments can respond to local variations in formation properties as drilling progresses. In some embodiments, where such measurements detect a significant change in formation properties, module 100 may automatically perform a range of impedance measurements at different frequencies to characterize the local properties of the formation. In some embodiments a significant change in formation properties may be recorded and a more thorough characterization of the formation at that location may be performed later (e.g. when another module 100 reaches the location where the formation has different properties). Measurements of formation impedance at the current frequency being used by module 100 may be automatically studied as a function of time to identify trends in formation impedance properties.

In light of the above, in practice, selecting an optimum frequency for electromagnetic telemetry transmissions is a trade-off. Once a frequency has been selected a power level may be chosen that is sufficient for the electromagnetic telemetry signals to be received at their intended destination.

In some embodiments where a plurality of modules 100 are provided at locations spaced apart along a drill string different modules 100 may transmit data by electromagnetic telemetry at individually-optimized frequencies. Each module 100 may include a processor configured to select an optimum data transmission frequency based on impedances recorded by the module and/or formation impedance information received from other modules. In other embodiments optimum frequencies for a number of modules 100 may be determined periodically by a processor at one location and the optimum frequencies may then be distributed to the modules. In other embodiments, optimum transmission frequencies are determined as a function of depth in the wellbore in advance (e.g. based on measurements made previously by one or more modules 100 or other formation resistivity measurement tools) and each module 100 may set a transmitting frequency based on its current depth. As another example, after formation properties have been characterized as described, for example, herein the frequency used by a module 100 to transmit telemetry signals may be automatically changed to the next optimum frequency based on a known event, such as a defined number of 'pumps off' conditions (where each pump off condition occurs when a new drill string segment is being added to the drill string thus indicating that the drill string has been drilled down to its full stroke, and that a new connection is being made at an increment of 30/60/90 feet—about 10/20/30 meters depending on whether the rig is single/double/or triple size rig).

Data may be relayed to the surface by transmitting it from one module 100 to another in sequence. In such embodiments, the optimum frequencies to use for one module 100 may be selected based on formation impedance measurements made as described herein between the module 100 and another module 100 to which the one module 100 is transmitting data. In such embodiments, since modules 100 may be relatively close together in comparison to the total depth of the wellbore, relatively higher frequencies for electromagnetic telemetry transmissions may be practical.

An example method for selecting a frequency to be used by a module 100 is:

A. Optionally identify a maximum frequency to be used based on a range from the module 100 to the surface or another intended destination for electromagnetic telemetry signals from the module 100. The range may be determined, for example, based on the depth of the module 100 (which may be determined using a pressure transducer for example) or a known spacing of modules 100 or the like.

B. Identify the highest frequency below the maximum for which the formation impedance at the module 100 is not particularly low in comparison to other frequencies.

C. Identify the frequencies for which the minimum formation impedance between the module 100 and the intended destination of the electromagnetic telemetry signals are lowest.

D. If the frequency identified at B is not included in the frequencies identified by C then use the frequency identified at B.

E. Otherwise, optionally check to see whether there is very much difference between the minimum impedances at different frequencies processed in C, if not then use the frequency identified at B anyway.

F. If there is a significant difference between the minimum impedances at different frequencies processed in C then repeat B through E starting with the next lower frequency for which the formation impedance at the module 100 is not particularly low in comparison to other frequencies.

Another approach is to compute a score for each possible frequency. The score may be based on the impedance of the formation 130 at the location of module 100 at that frequency as well as the minimum impedance at that frequency presented by formations penetrated by the wellbore between the module 100 and the intended destination of the electromagnetic telemetry signals. The score may optionally also be a function of the distance between the module 100 and the intended destination of the electromagnetic telemetry signals. A wide range of functions may be used to generate a score. In general, the score should be made worse (worse can be lower or higher depending on the implementation) by low impedance at the location of module 100 and also by low minimum impedance between the module 100 and the intended destination. The frequency corresponding to the best score may be selected.

In a simple embodiment the score for a frequency may comprise a product of the formation impedance at that frequency and the minimum impedance at the frequency between the module 100 and the intended destination. In some embodiments the score may include a frequency-dependent weighting factor to take into account the fact that higher frequencies tend to be more strongly attenuated than lower frequencies (such that higher frequencies may need to be transmitted using higher power) and/or the fact that higher frequencies allow faster data transmission so that a given amount of data can be transmitted in less time (such that, everything else being equal, less energy per bit of transmitted data may be used when transmitting at higher frequencies).

In some embodiments, the gap of module 100 may be used to transmit EM telemetry signals. An EM telemetry signal generator, which may comprise an H-Bridge, is connected across gap 105. In some embodiments, the EM telemetry signal generator serves as the voltage source for resistivity measurements. The gap 105 of module 100 may be used to both (a) measure the resistivity of formation 130 and (b) transmit the resulting resistivity measurements via EM telemetry. Properties of formation 130 may be measured by measuring characteristics of signals which are also used as EM telemetry signals.

In some embodiments, drilling fluid 120 may be a high-resistance drilling fluid (e.g. an oil-based drilling fluid). Using a high-resistance drilling fluid may cause a relatively greater portion of the current to flow through formation 130, rather than through drilling fluid 120, and may thereby result in more accurate measurements of the resistivity of the formation.

Figure 3:
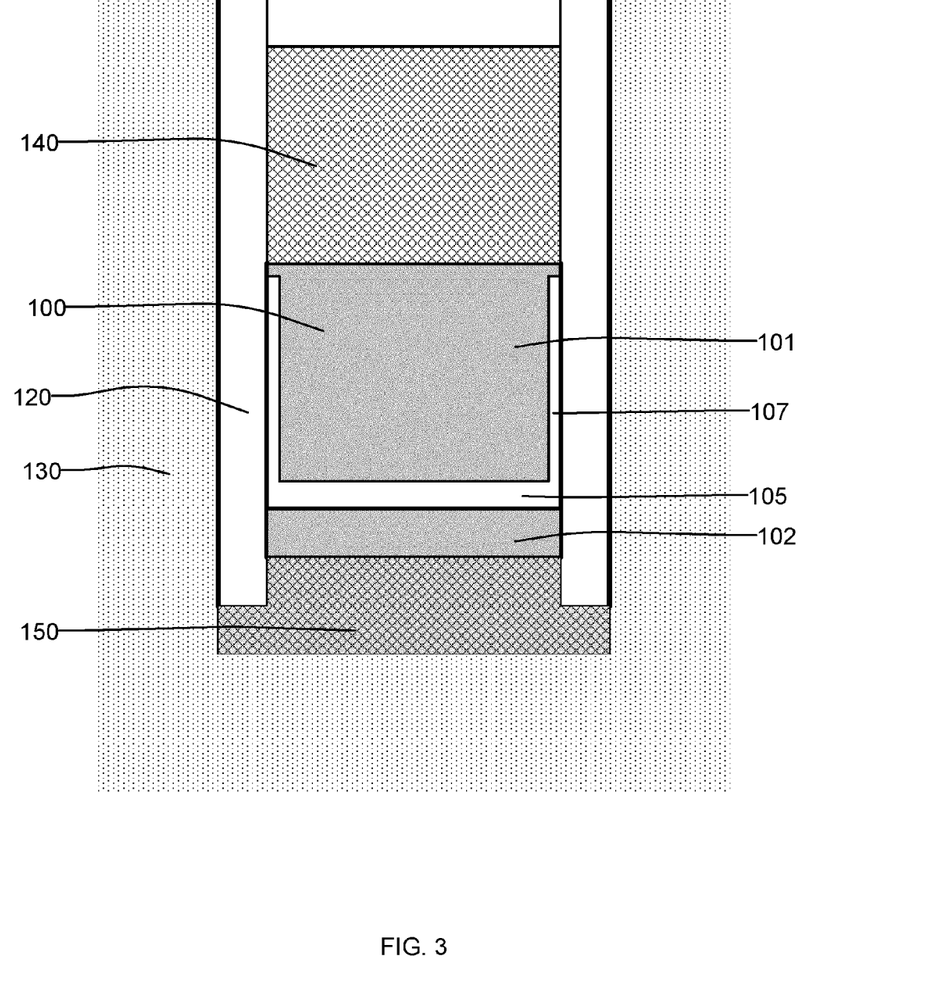
FIG. 3 is a cross-sectional view of the module of FIG. 2 in an alternative configuration.

FIG. 3 is a cross-sectional view of module 100 in an alternative configuration. Module 100 is coupled to mud motor 140 at its uphole end and to drill bit 150 at its downhole end. Mud motor 140 may extract energy from the flow of drilling fluid through the drill string and may apply this energy to turn drill bit 150. In some embodiments, mud motor 140 may be absent and drill bit 150 may be turned by rotating the drill string. In some embodiments there may be other elements (e.g. sections of drill string, adapters, etc.) between module 100 and mud motor 140 and/or between module 100 and drill bit 150.

Positioning module 100 adjacent to drill bit 150 may provide several advantages over positioning module 100 higher up in the drill string.

First, when module 100 is located higher up in the drill string it may be subject to a large tensional load from the weight of the drill string below it. When module 100 is positioned adjacent to drill bit 150 it only has to support the tensional load generated by the weight of drill bit 150.

Second, when module 100 is located higher up in the drill string it may be forced against the sides of the bore hole (e.g. during directional drilling) which may cause damage to module 100 and/or insulating sleeve 107. Contact between module 100 and the sides of the bore hole may create a grounding point, which may cause inaccurate measurements. Lateral movement of module 100 within the bore hole may cause the thickness of the layer of drilling fluid surrounding module 100 to change, which may cause inaccurate measurements. This issue may be addressed by providing a centralizer to keep module 100 centered in the borehole. When module 100 is positioned adjacent to drill bit 150, drill bit 150 maintains module 100 in the centre of the bore hole, protecting it from damage resulting from contact with the walls of the bore hole and allowing it to take consistent measurements from a concentric location within the bore hole.

Third, when module 100 is located higher up in the drill string it measures the properties of a portion of formation 130 that is relatively far away from drill bit 150. When module 100 is adjacent to drill bit 150 it measures the properties of a portion of formation 130 that is close to drill bit 150, and thus module 100 may provide data that is highly relevant to drilling operations.

Fourth, when module 100 is located higher up in the drill string, second portion 102 is "grounded" to formation 130 via a relatively long path through the drill string all the way down to drill bit 150, which directly contacts formation 130. This relatively long path may present a relatively high electrical resistance, which may adversely affect the measurement of the resistivity of formation 130. When module 100 is adjacent to drill bit 150, second portion 102 is "grounded" to formation 130 via a relatively short path through drill bit 150. This short path may have relatively low resistance, and may allow for relatively more accurate measurements of the resistivity of formation 130.

This invention has various aspects. One aspect provides a method involving: monitoring an electrical resistance of a formation through which a wellbore passes by applying a potential difference between two sections of a drill string separated from one another by an electrically-insulating portion and monitoring an electrical current delivered to at least one of the sections of drill string; encoding a value of the electrical resistance and transmitting the encoded value by applying a varying electrical potential between the sections of drill string to yield an EM telemetry signal carrying the encoded value.

Another aspect of this invention provides a module comprising:

a first portion and a second portion electrically insulated from each other by an insulating portion;
an insulating sleeve extending along an outside surface of the module, the insulating sleeve contacting the insulating portion to provide an electrically insulating gap;
a voltage source configured to generate a potential difference between the first portion and the second portion; and
a sensor configured to measure a property of a current flowing between the first portion and the second portion.

Another aspect of this invention provides a method for measuring the resistivity of a formation, the method comprising:

providing a module comprising:
a first portion and a second portion electrically insulated from each other by an insulating portion;
an insulating sleeve extending along an outside surface of the module, the insulating sleeve contacting insulating portion to provide an electrically insulating gap;
applying a potential difference between the first portion and the second portion; and
measuring a property of a current flowing between the first portion and the second portion.

Another aspect of this invention provides a module mounted adjacent to a drill bit.

While a number of exemplary aspects and embodiments have been discussed above, those of skill in the art will recognize certain modifications, permutations, additions and sub-combinations thereof.

Interpretation of Terms

Unless the context clearly requires otherwise, throughout the description and the claims:
"comprise," "comprising," and the like are to be construed in an inclusive sense, as opposed to an exclusive or exhaustive sense; that is to say, in the sense of "including, but not limited to".
"connected," "coupled," or any variant thereof, means any connection or coupling, either direct or indirect, between two or more elements; the coupling or connection between the elements can be physical, logical, or a combination thereof.
"herein," "above," "below," and words of similar import, when used to describe this specification shall refer to this specification as a whole and not to any particular portions of this specification.
"or," in reference to a list of two or more items, covers all of the following interpretations of the word: any of the items in the list, all of the items in the list, and any combination of the items in the list.
the singular forms "a," "an," and "the" also include the meaning of any appropriate plural forms.
Words that indicate directions such as "vertical," "transverse," "horizontal," "upward," "downward," "forward," "backward," "inward," "outward," "vertical," "transverse," "left," "right," "front," "back", "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for downhole data transmission, the method comprising:
    at each of a plurality of modules spaced apart along a drill string:
    monitoring electrical impedance properties of a downhole formation in a locality of the module by applying an electrical signal between a first portion and a second portion of the module that are electrically insulated from each other by an insulating portion;
    based at least in part on the monitored electrical impedance properties selecting a frequency for use by the module in transmitting data by electromagnetic telemetry;
    transmitting the data to another one of the modules by encoding the data in a waveform having the selected frequency and applying the waveform between the first portion and the second portion of the module.

2. A method according to claim 1 wherein the electrical impedance properties of the formation comprise capacitive reactance of the formation.

3. A method according to claim 2 comprising determining a capacitance of the formation in the vicinity of the insulating portion based on measurements of the capacitive reactance of the formation at two or more frequencies.

4. A method according to claim 1 wherein the insulating portion of one of the modules is between a mud motor and a drill bit.

5. A method according to claim 1 wherein a drilling fluid surrounding the drill string is an oil-based drilling fluid.

6. A method according to claim 1 wherein selecting a frequency for transmitting data by electromagnetic telemetry comprises:
    identifying a maximum frequency for transmitting data by electromagnetic telemetry to be used based on a depth of the module; and
    selecting a highest frequency below the maximum frequency for which local formation impedance is not relatively low in comparison to other frequencies and non-local formation impedance is not relatively low in comparison to other frequencies.

7. A method according to claim 1 wherein monitoring electrical impedance properties of a downhole formation is performed continuously.

8. A method according to claim 1 wherein monitoring electrical impedance properties of a downhole formation is performed periodically.

9. A method according to claim 1 wherein selecting a frequency for transmitting data by electromagnetic telemetry comprises selecting a frequency having a highest score, the score of a frequency to be scored comprising a product of a formation impedance at the frequency to be scored and a minimum impedance at the frequency to be scored between the formation and an intended destination.

10. A method according to claim 9 wherein the score comprises a weighting factor to compensate for increased attenuation at an increased frequency.

11. A method according to claim 9 wherein the score comprises a weighting factor to compensate for increased data transmission at an increased frequency.

12. A method according to claim 1 comprising repeating the method when one or more drill string segments is added.

13. Drilling apparatus comprising:
    a plurality of modules spaced apart from one another along a drill string, each of the modules associated with an electrically-insulating gap portion electrically-separating electrically-conductive portions of the module above and below the gap portion, each of the modules comprising:
    a power source operative to apply a voltage across the gap portion at any of a plurality of frequencies,
    a current meter operative to monitor an electrical current being delivered from the power source to one or both of the electrically conductive portions; and
    a controller connected to control the power source,
    wherein the controller is configured to monitor electrical impedance properties of a downhole formation in the vicinity of the module by applying an electrical signal across the gap portion of the module; based at least in part on the monitored electrical impedance select a frequency for transmitting data by electromagnetic telemetry; and transmitting the data by encoding the data in a waveform having the selected frequency and controlling the power source to apply the waveform across the gap portion such that each of the plurality of modules transmits data at a frequency based on locally monitored electrical impedance.

14. A drilling apparatus according to claim 13 wherein one of the modules is mounted between a mud motor and a drill bit.

15. A drilling apparatus according to claim 13 wherein the voltage applied across the gap portion is constant.

16. A drilling apparatus according to claim 13 wherein the voltage applied across the gap portion varies as a function of current.

17. A drilling apparatus according to claim 13 wherein a potential difference applied is varied to maintain a constant current.

18. A drilling apparatus according to claim 13 wherein the voltage varies with a frequency between 1 Hz and 10 kHz.

19. A drilling apparatus according to claim 13 wherein the voltage varies sinusoidally.

20. A drilling apparatus according to claim 13 wherein the current varies with a frequency between 1 Hz and 10 kHz.

21. A drilling apparatus according to claim 13 wherein the current varies sinusoidally.

22. A drilling apparatus according to claim 13 wherein the gap portion comprises an insulating sleeve.

23. A drilling apparatus according to claim 22 wherein the insulating sleeve comprises a polymer material or a ceramic material.

24. A drilling apparatus according to claim 13 wherein the plurality of modules are spaced apart by distances of at least approximately 10 meters.

25. A drilling apparatus according to claim 24 wherein the plurality of modules are spaced apart by distances of approximately 20 meters or 30 meters.

26. A drilling apparatus according to claim 13 comprising a sensor to measure resistivity and a processor configured to use a resistivity measurement from the sensor to calculate properties of a formation.

27. A drilling apparatus according to claim 13 wherein a phase shift between the applied voltage between the electrically-conductive portions and a resulting current is measured at one-or more frequencies.

* * * * *